J. I. GORTON.
Corn Husker.
No. 84,876.
Patented Dec. 15, 1868.
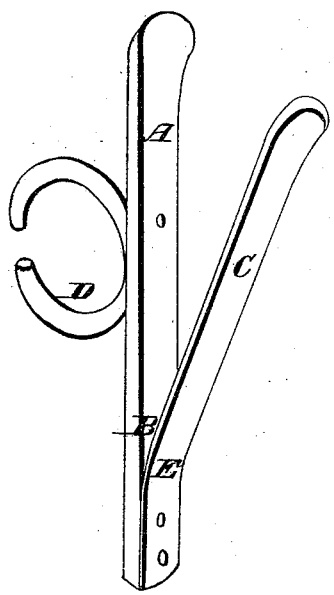

J. IRVING GORTON, OF SING SING, NEW YORK.

Letters Patent No. 84,876, dated December 15, 1868; antedated December 11, 1868.

IMPROVEMENT IN CORN-HUSKER.

The Schedule referred to in these Letters Patent and making part of the same.

Be it known that I, J. IRVING GORTON, of Sing Sing, in the county of Westchester, and State of New York, have invented a new and useful Tool for Husking Indian Corn; and I do hereby declare that the following is a full, clear, and exact description of the construction and operation of the same, reference being had to the annexed drawings, forming a part of this specification.

A B is a bar or strip, of iron or other substance, of a convenient length to be grasped and held in the hand.

D is a ring, of metal, leather, or some other suitable substance, attached to the bar A B, to go over one or more of the fingers, for the purpose of keeping the tool in place on the hand.

C is a bar or jaw, of metal or other suitable substance, attached at or near the lower end to the bar A B by a spring, E, such spring E being merely a continuation of the bar C, and being made of steel, brass, rubber, or other suitable substance.

The bar C is flattened at the upper end, so as to form, in connection with the bar A B, a sort of nippers or tweezers, for the purpose of grasping and holding the husk, so as to pull it from the ear; and the bars C and A B are sharpened at the end to cut the husk, and are milled or roughened for a short distance from the end, the better to hold the husk.

The whole tool is designed to be so compact as to leave between it and the thumb room enough for seizing the ear of corn, to break it from the stalk after the husk is removed.

Now, to use the tool, the ring D is placed on one or more of the fingers, in such a manner that the rest of the tool shall be within the hand, with the bar C toward the thumb. The thumb then presses down the bar C, and with it and the bar A B the husk is cut, grasped, and pulled from the ear. Upon relaxing the pressure of the thumb, the bar C is thrown back by the spring, thus opening the jaws for grasping another husk.

Claim.

What I claim as my invention, and desire to secure by Letters Patent, is—

Combining the parts A B C D E, substantially as described and for the purpose mentioned.

J. IRVING GORTON.

Witnesses:
  JOAKIM URMY,
  JOSEPH BARRETT.